United States Patent [19]

Gritzo et al.

[11] Patent Number: 5,471,062
[45] Date of Patent: Nov. 28, 1995

[54] LARGE VOLUME FLOW-THROUGH SCINTILLATING DETECTOR

[75] Inventors: Russ E. Gritzo; Malcolm M. Fowler, both of Los Alamos, N.M.

[73] Assignee: The Regents of the University of California, Oakland, Calif.

[21] Appl. No.: 217,394

[22] Filed: Mar. 21, 1994

[51] Int. Cl.⁶ .................................................. G01T 1/20
[52] U.S. Cl. ........................................ 250/368; 250/367
[58] Field of Search ................................. 250/368, 367, 250/366, 486.1

[56] References Cited

U.S. PATENT DOCUMENTS

| | | | |
|---|---|---|---|
| 4,495,420 | 1/1985 | Chudy et al. | 250/367 |
| 4,931,646 | 6/1990 | Koechner | 250/368 |
| 4,975,583 | 12/1990 | Spowart | 250/367 |
| 5,227,633 | 7/1993 | Ryuo et al. | 250/367 |

FOREIGN PATENT DOCUMENTS 2232482  12/1990  United Kingdom .................. 250/367

OTHER PUBLICATIONS

Burnham et al., "Design of a Cylindrical Shaped Scintillation Camera . . ." IEEE Trans. Nuc. Sci. vol. NS–32, #1 (Feb. 1985) p. 889.

*Primary Examiner*—Paul M. Dzierzynski
*Assistant Examiner*—Richard Hanig
*Attorney, Agent, or Firm*—Milton D. Wyrick; William A. Eklund

[57] ABSTRACT

A large volume flow through radiation detector for use in large air flow situations such as incinerator stacks or building air systems comprises a plurality of flat plates made of a scintillating material arranged parallel to the air flow. Each scintillating plate has a light guide attached which transfers light generated inside the scintillating plate to an associated photomultiplier tube. The output of the photomultiplier tubes are connected to electronics which can record any radiation and provide an alarm if appropriate for the application.

8 Claims, 6 Drawing Sheets

LARGE VOLUME FLOW-THROUGH SCINTILLATING DETECTOR

FIELD OF THE INVENTION

The present invention generally relates to the detection of radiation, and, more specifically to the real-time detection of radiation in large volumes of moving air. The invention is a result of a contract with the Department of Energy (Contract No. W-7405-ENG-36).

BACKGROUND OF THE INVENTION

As the world becomes more aware and concerned about radiation and its effects, the need arises for better detection of radiation in those areas where radiation may pose a threat. With the increased knowledge of the threat posed by naturally occurring radon and its daughters, there is a need for continuous monitoring of air moving in buildings and homes. Additionally, within the nuclear industry, there is also an urgent need for monitoring of air emanating from smokestacks and moving within structures.

Currently, monitoring of the air in nuclear facilities is typically done using non-real time devices. Such devices do not provide a timely notice of an excessive exposure rate. With the current public awareness of the danger of radiation, it is imperative that real-time warning of exposure be instituted.

Equally important is monitoring for such threats as radon and its daughters. Monitors for this threat are only now reaching the marketplace, but most require long periods of exposure and laboratory analysis before the extent of the radon problem is known.

There is a definite need in both nuclear facilities and in other facilities for the real-time monitoring of radiation. For maximum protection, these monitors should be in the air movement system of the particular building because it is through these systems that airborne radioactive materials enter and are distributed throughout buildings, leading to possible exposure of personnel. However, the monitor must not interfere with or otherwise impede the flow of air throughout the building. It is therefore an object of the present invention to provide apparatus which will provide real-time detection and warning of potential radiation exposure.

It is another object of the present invention to provide radiation detection apparatus which may be inserted into air movement systems such as heating or air conditioning ducts, or in the stacks of nuclear facilities.

It is still another object of the present invention to provide radiation detection apparatus capable of detecting the airborne radioactive material in sub-pico Curie/liter concentration range.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a large volume flow through radiation detector comprising a plurality of plates comprised of a scintillating material and a plurality of photomultiplier tubes, one or more of the plurality of photomultiplier tubes being associated with each of the plurality of flat plates. A plurality of light guide means are connected between each of the plurality of flat plates and each of the plurality of photomultiplier tubes for conducting light generated in the flat plates due to radiation entering the plurality of flat plates to the plurality of photomultiplier tubes.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for the real-time detection and warning of the presence of radiation in which the detection part of the invention can be placed directly in the air flow of a stack or a heating and air conditioning system.

Figure 1:
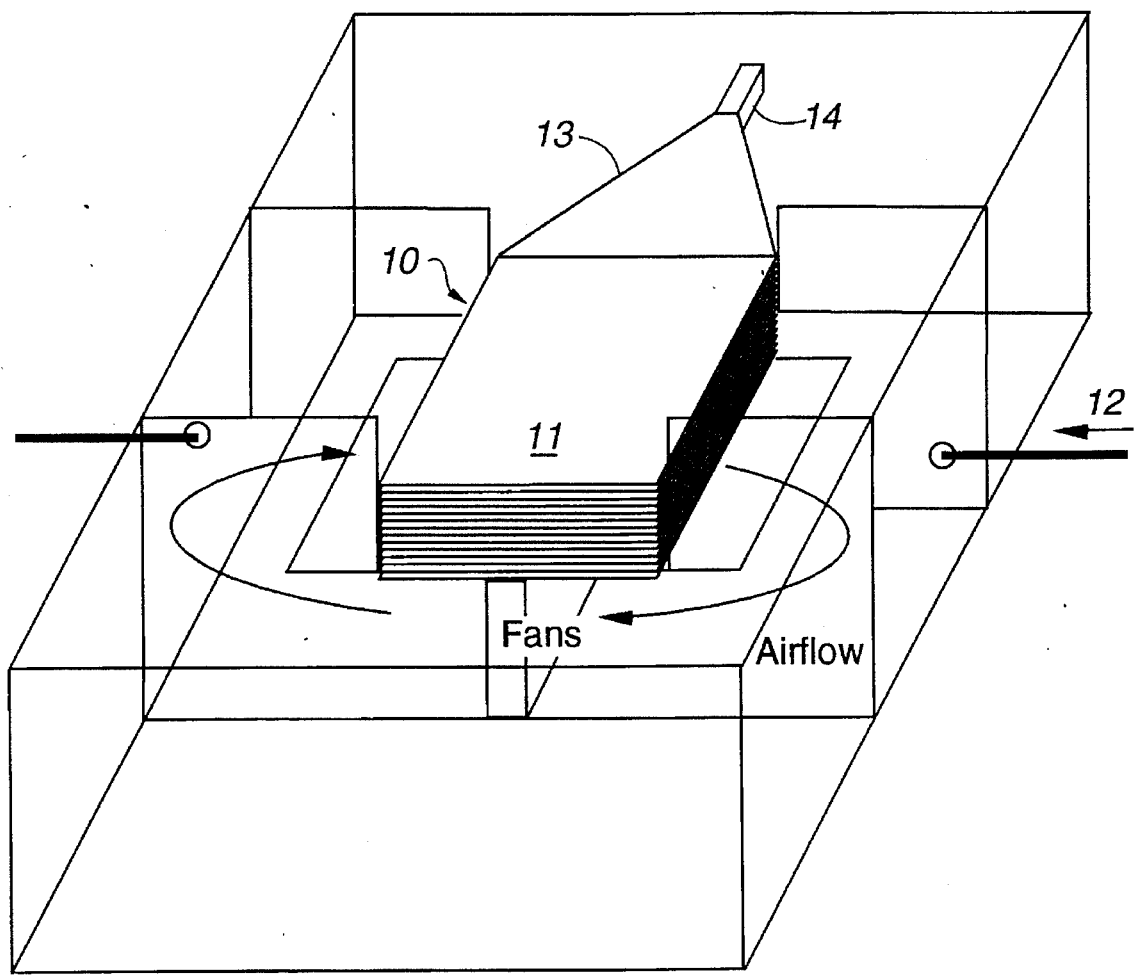
FIG. 1 is a skeletal view of an array of scintillating plates and a representative light guide and photomultiplier tube.

The invention will be best understood by reference to the drawings. Turning first to FIG. 1, it can be seen that the present invention involves an array 10 of thin scintillating plates 11 aligned parallel to gas flow 12. Scintillating plates 11 are separated by a few centimeters, the distance being a function of the anticipated radioactive species to be detected in a particular application. It should be initially recognized that the invention can be practiced with scintillating plates 11 having shapes other than as flat plates. They can be of any shape appropriate for a particular application which allow the free flow of air about their surfaces.

Airborne alpha emitters or other radioactive material present within gas flow 12 undergo decay and emit energetic particles. As scintillating plates 11 are closely spaced, the majority of the emitted energetic particles will strike one of scintillating plates 11 with a reasonable amount of energy, irrespective of the angle of emission. As scintillating plates, in general, are quite good at emitting light when struck with a charged particle, such as an alpha particle, those hitting scintillating plates 11 will produce a reasonable amount of light.

Light generated by a charged particle hitting scintillating plates 11 is collected by light guides 13, which conveys the light to photomultiplier tubes 14. Photomultiplier tubes 14 convert the light into electrical pulses, which are used to indicate the presence of radiation.

Light guide 13 may be made of any effective light transmission medium which is also compatible with the spacing of scintillating plates 11. That is, light guide 13 must occupy a small enough space so as not to physically interfere with the positioning of scintillating plates 11. Systems for performing as light guide 13 include, but are not limited to fiber optics, flat UVT acrylic, wide and narrow twisted ribbons, and tubular acrylic. Each of these light guide 13 designs mate with a side of a scintillating plate 11 to collect the light produced by a charged particle.

Testing has indicated that the wide twisted ribbon has the best optical efficiency of the above list. However, due to the twisting of the wide ribbons necessary to bring them into a photomultiplier tube 14, the ribbons prevented scintillating plates 11 from being positioned close to one another. This limits the efficiency of present invention. With narrower, but thicker ribbons as light guide 13, optical efficiency was similar to the wide ribbon design, but still did not permit close spacing of scintillating plates 11, and was difficult to fabricate because of the thicker material.

The simplest, and perhaps most efficacious design for light guide 13 is the flat acrylic plate which mates with a side of a scintillating plate 11, and tapers to the input of a photomultiplier tube 14. This design provides an optical efficiency of approximately one-half of the wide ribbon design, and is mechanically simple and rigid. The flat acrylic plate is easy to manufacture, but does allow light loss along its edges. The positioning of scintillating plates 11 is simplified because with a designed offset in the flat plate, the photomultiplier tubes 14 can be spaced apart from each other, allowing closer positioning of scintillating plates 11.

Another very viable design for light guide 13 involves a solid tube of acrylic, with the edges of scintillating plates 11 intersecting the edge of the tubes slightly tangentially. Although the tubular light guide 13 also has about one-half the optical efficiency of the wide ribbon design, and is thought to offer complete internal reflection of the light, it does present plate 11 positioning problems. It, too, is simple, and is potentially more compact, and easily extended for long scintillating plates 11.

The optical fiber design for light guide 13 involves coupling the ends of the optical fiber to the edges of scintillating plates 11, and bundling the fibers together for coupling to photomultiplier tubes 14. This design might present some fabrication problems, but is compact and allows close positioning of scintillating plates 11 due to the ability to offset photomultiplier tubes 14. However, at the current time, the optical efficiency of the optical fiber light guide 13 is only about one-quarter of the efficiency of the wide twisted ribbon.

The choice of the proper light guide 13 will depend on the particular application and the expected radiation levels. Where some loss of light can be tolerated, the flat plate design appears to offer the greatest advantages.

Figure 2:
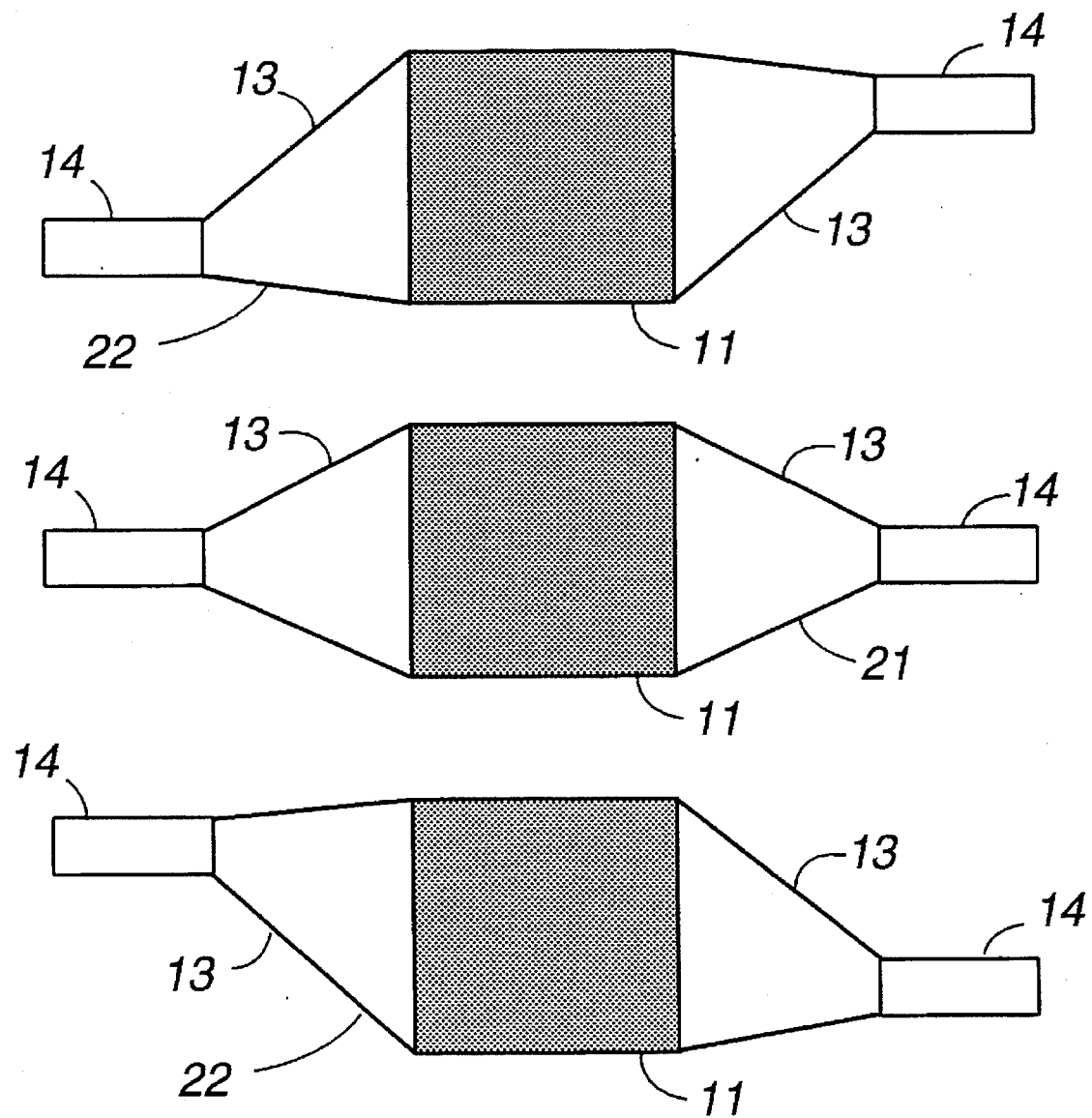
FIG. 2 is a schematic diagram of various configurations of flat acrylic light guides.

As shown in FIG. 2, the flat plate design of light guide 13 can allow for efficient stacking of scintillating plates 11, allowing for the positioning of photomultiplier tubes 14. The present embodiment of the invention uses photomultiplier tubes which are approximately 5 cm in diameter, but light guides 13 must be configured so as to allow the positioning of scintillating plates 11 approximately 2 cm apart. In FIG. 2, two configurations of light guides 13 are illustrated. Symmetrical 21 light guide 13 would be used with one-third of the scintillating plates 11, while asymmetrical 22 light guides are used on the other two-thirds, one third as shown at 22, and the other third reversed. This allows for the close spacing of scintillating plates 11, even with the relatively large diameter of photomultiplier tubes 14. These are certainly not the only possible configurations for light guides 13, and any workable configuration could be as effective. The illustrated configurations do allow for efficient machining and manufacture.

Reference should now be returned to FIG. 1. In one embodiment of the invention, one side of each of scintillating plates 11 can be coated with a thin layer of aluminum of approximately 400–500 Å thickness. This is to protect scintillating plates 11 from damage due to possible particulates or chemical vapors which might be flowing through array 10. In some cases, it might also provide optical isolation from adjacent scintillating plates 11, to assist in reducing background radiation effects.

In the present invention, as in most radiation detectors, background radiation must be minimized. One method of background reduction is to detect and disregard multiple plate 11 coincidences, since an alpha particle can only strike one plate 11, and multiple plate 11 coincidences can be considered a background event. This assumption would not hold at very high alpha particle count rates, but the present invention is intended for low count rate applications. One possible exception to this analysis is the case where light from an alpha event in one plate 11 escapes and strikes an adjacent plate 11. The aluminum coating reduces the possibility of this type of cross-talk. Aluminum was chosen for this use because it is very easy to apply and is a good conductor of electricity.

However, testing has indicated that most of the light escaping from a plate 11 is not capable of reaching an adjacent plate 11 and causing internal reflection within that plate. Because of this, it appears that scintillating plates 11 are, to a large extent, inherently optically isolated. In some applications, the air passing through array 10 may not be deleterious to uncoated scintillating plates 11. In this situation, coating of plates 11 is probably not necessary. For example, in most incinerator applications, after the off-gas treatment systems, the gas stream is free of scintillator damaging chemicals and particulates.

Figure 3:
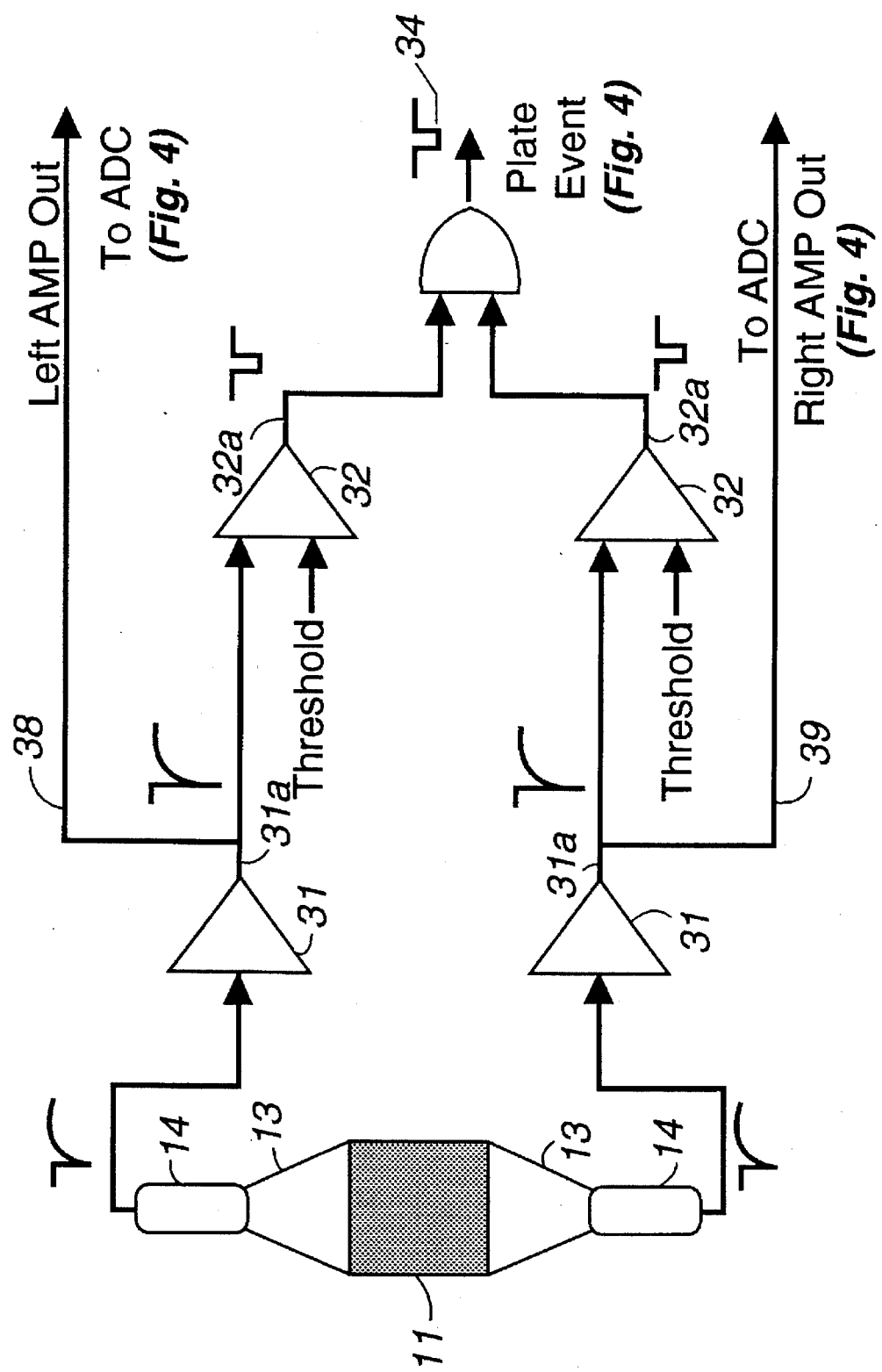
FIG. 3 is a schematic diagram of a the coincidence portion of the signal processing associated with the present invention.

Referring now to FIG. 3, wherein there can be seen a schematic diagram of the plate event electronics associated with a scintillating plate 11, and its light guides 13 and photomultiplier tubes 14. To reduce background, particularly that caused by thermal electron emission in photomultiplier tubes 14, the present invention requires coincidence between the outputs of the photomultiplier tubes 14 for each scintillating plate 11. To accomplish this, each scintillating plate 11 is fitted with what will be termed left and right light guides 13 and corresponding left and right photomultiplier tubes 14. In order for a scintillating plate 11 to generate a real event, both photomultiplier tubes 14 must simultaneously detect a light signal. This requirement for coincidence between the outputs of photomultiplier tubes 14 eliminates errors caused by thermally generated random events.

The photomultiplier tubes 14 used in the current invention are manufactured by Burle Industries, Inc., Lancaster, Pa. 17601, and are Burle Type 8850. These photomultiplier tubes 14 have very fast timing properties, allowing the coincidence resolving time to be very short. The benefit of these timing properties is most easily seen through an estimation of the contribution of random events to the background for a single scintillating plate 11. As shown in FIG. 3, the outputs of photomultiplier tubes 14 are connected to left and right amplifiers 31. Outputs 31a, 31b of amplifiers 31 are connected to left and right discriminators 32, and outputs 38, 39 are provided to analog to digital converter 40 (FIG. 4).

With conventional amplifiers 31 and discriminators 32, and the trigger level for each photomultiplier tube 14 set at about 0.1 photoelectron equivalent, the single photomultiplier tube 14 trigger rate is about 2 kHz. With a requirement of coincidence between left and right photomultiplier tubes 14, using a resolving time of 50 ns, the expected random coincidence rate is only 0.2 Hz. This coincidence count rate represents a reduction factor of 10,000 in the background.

As shown in FIG. 3, the outputs 32a of left and right discriminators 32 are connected to AND gate 33. Thus, when the outputs of left and right discriminators 32 are simultaneous, AND gate 33 emits a plate event pulse 34.

Figure 4:
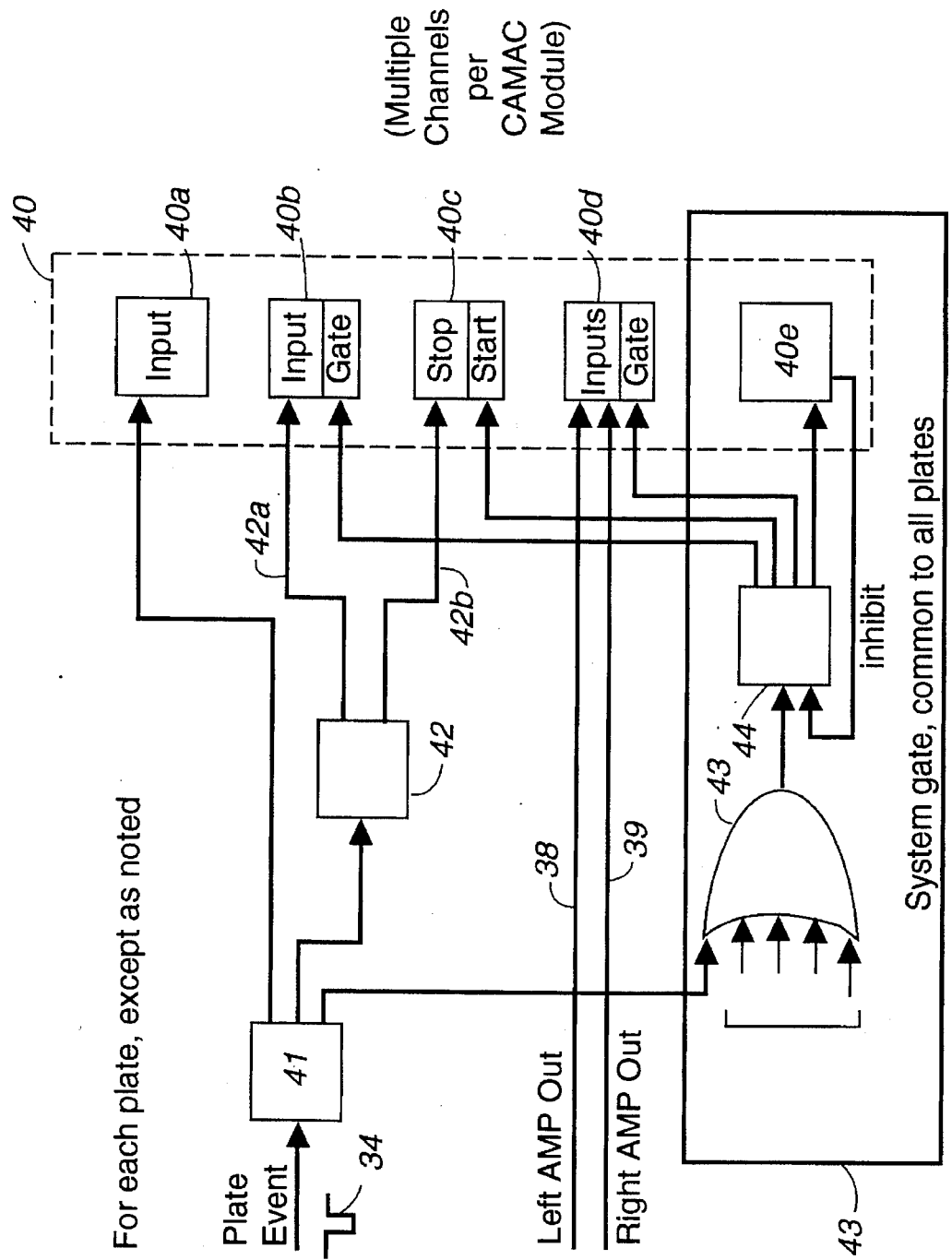
FIG. 4 is a schematic diagram of the counting and output section of the signal processing associated with the present invention.

Attention should now be directed to FIG. 4, wherein there is illustrated a block diagram of the remaining electronic components of the invention. It should be noted that the following description involves the generic components which enable operation of the invention. Actual applications of the invention would employ circuit boards and hard-wired components instead of the discrete components discussed in the following paragraphs.

In FIG. 4, the circuitry for each scintillating plate 11 (FIG. 1) is shown, along with the circuitry for the system gate 43, which is common for all scintillating plates 11. As shown, event pulse 34 from AND gate 33 (FIG. 3) is input to fan out 41. Fan out 41 is simply circuitry to replicate event pulse 34 and provide it to scaler 40a of CAMAC module 40, gate and delay circuit 42, and to Grand OR gate 43, which is common to all plates 11 (FIG. 1). A free-running clock (not shown) is also input to scaler 40a. This arrangement allows the counts per unit time to be determined for each individual plate 11.

Output 42a of gate and delay circuit 42 is connected to the input of hit pattern register 40b of CAMAC module 40. Hit pattern register 40b provides useful information for dealing with background reduction using multiple scintillating plates 11 (FIG. 1). Time to digital converter 40c of CAMAC module 40 has output 42b of gate and delay circuit 42 inputted, and is used to provide a record of the relative temporal distribution of plate 11 (FIG. 1) events. Analog to digital converter 40d of CAMAC module 40 receives outputs 38, 39 of left and right amplifiers 31 (FIG. 3) and provides the light intensity for each event occurring in each plate 11 (FIG. 1).

Another pulse signal from fan out 41, along with like connections from each other scintillating plate 11 (FIG. 1), is connected to grand OR gate 43 to provide through discriminator 44 and gate and delay circuit 40e of CAMAC module 40, a signal indicating a counting event in one or more plates 11. Gate and delay circuit 40e provides an inhibit signal to prevent new events from being processed until a controlling computer (not shown) is ready to read another event. The computer would reset this inhibit signal after it has processed an event.

EXAMPLE

Several scintillating plates 11 (FIG. 3) were placed inside a NEMA type 4 enclosure, which was made light tight, and reasonably air tight. The flat plate design was used for light guides 13 (FIG. 3). A radon source was used as the radioactive source. This was a commercially available radon gas source supplied by Pylon Electronic Development CO., Ltd., model TH-1025. This source contains $^{228}$Th that decays to $^{224}$Ra, and then to $^{220}$Rn. The radon emanates from the solid source and is swept from the source with a nitrogen carrier gas. The concentration of $^{220}$Rn in the carrier gas is determined by the $^{228}$Th activity in the source, the flow rate and the volume of the system.

At the time of this test, the activity in the source was 0.460 µCi. The volume of the source and associated delivery tubing was estimated to be 242 cm$^3$. The carrier gas flow rate was set at 0.9 l/m. These values were used to calculate the concentration of $^{220}$Rn delivered to the enclosure as 0.325 µCi. The circulating air volume in the enclosure was calculated to be 77 liters. An assumption was made that the equilibrium concentration of radon in the circulating volume was the delivery concentration diluted to the circulating volume. This results in an equilibrium radon concentration in the circulating air in the enclosure of about 3.8 nCi/l.

Figure 5:
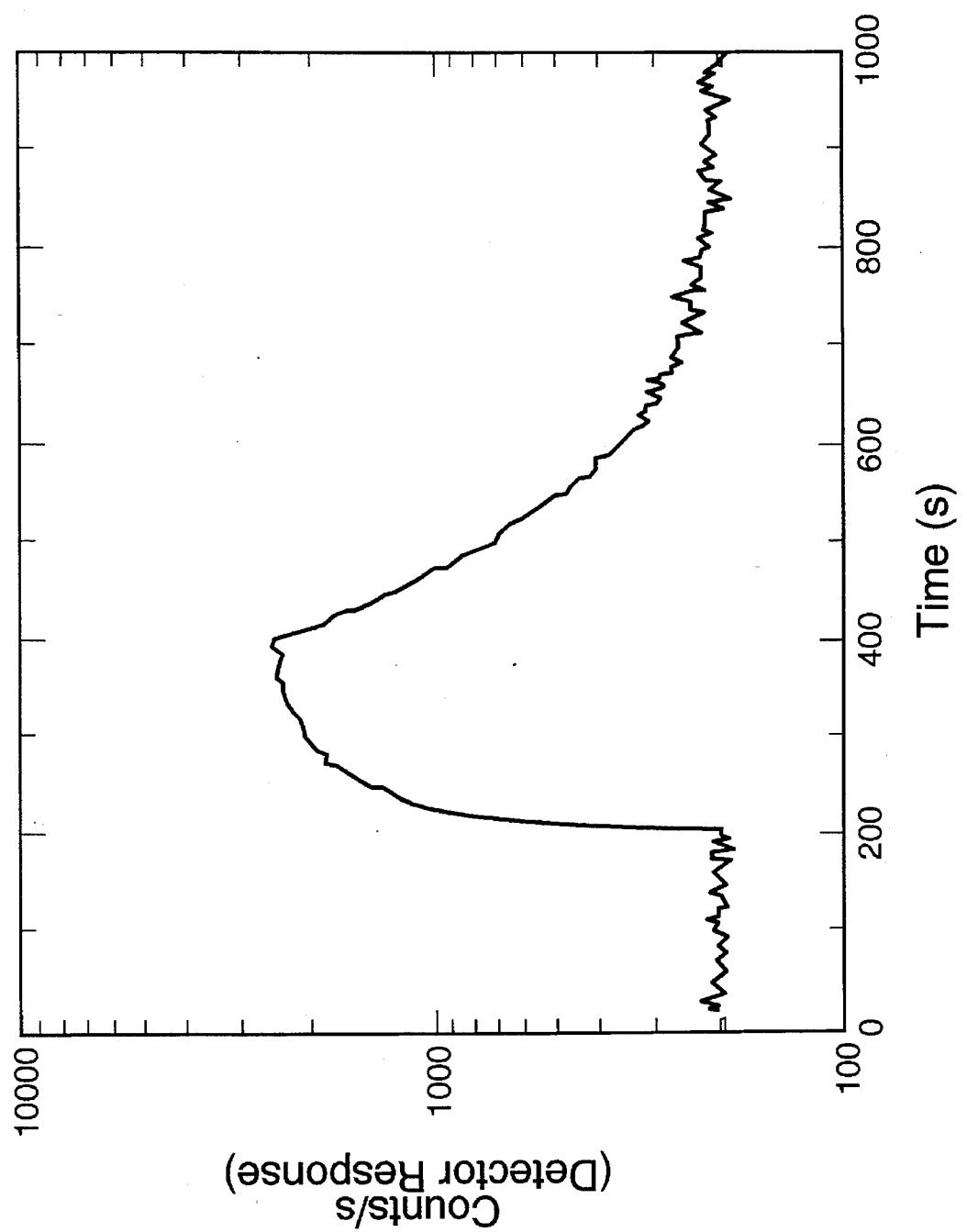
FIG. 5 is a plot of the response of the present invention to an air stream containing $^{220}$Rn.

The results are shown in FIG. 5, where the count rate was measured every 5 seconds by software written for this test. The background was measured by starting the counting before introduction of the radon gas. In FIG. 5, the response of the current invention can be seen. As the radon is introduced into the enclosure at about the 200 sec mark, the counting rate in the detector increases with the 55 s half-life of the $^{220}$Rn exactly as would be expected. When the flow of radon gas was stopped at about the 400 sec mark, the counting rate decayed with the half-life of the $^{220}$Rn, again as would be expected. The slope of this decay portion of the test run was plotted and the slope of the line, hand fit to the decay curve data, yields a half-life of ~53 s, in close agreement with the published half-life of $^{220}$Rn.

Figure 6:
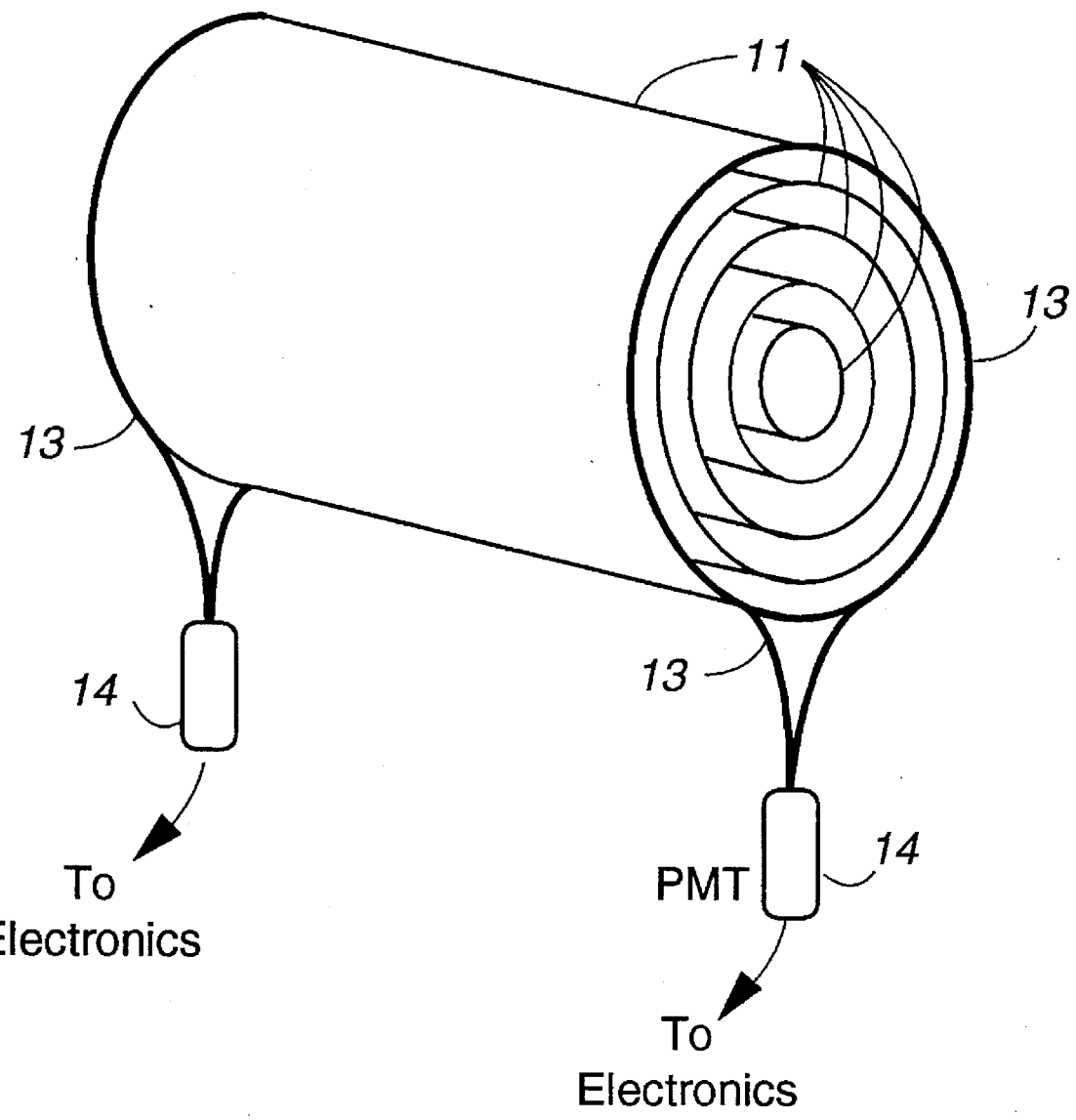
FIG. 6 is a schematic diagram of the embodiment of the present invention in which cylindrical scintillating plates are used.

It should be recognized that scintillating plates 11 (FIG. 2) do not have to be flat. They could be of any shape which would be appropriate for a particular application. For instance, plates 11 could be cylindrically shaped as illustrated in FIG. 6 with a transparent fiber or acrylic light guide 13 for transmitting light to the associated photomultiplier tube 14.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A large volume flow through radiation detector comprising:

a plurality of spaced apart plates comprising a scintillating material;

a plurality of photomultiplier tubes, two or more of said plurality of photomultiplier tubes associated with each of said plurality of flat plates;

a plurality of light guide means connected between said plurality of flat plates and said plurality of photomultiplier tubes for conducting light generated in said flat plates due to said radiation entering said plurality of flat plates to said plurality of photomultiplier tubes.

2. The detector as described in claim 1, wherein said one or more of said plurality of photomultiplier tubes comprises two photomultiplier tubes.

3. The detector as described in claim 1, wherein said plurality of plates comprises flat plates are stacked in close proximity to one another.

4. The detector as described in claim 1, wherein said plurality of plates comprises cylinders arranged parallel to one another.

5. The detector as described in claim 1, wherein said plurality of light guide means comprises a plurality of flat acrylic plates mated with one or more sides of said plurality of plates.

6. The detector as described in claim 1, wherein said plurality of light guide means comprises of plurality of optical fibers mated with one or more sides of said plurality of plates.

7. The detector as described in claim 1, wherein said plurality of light guide means comprises of plurality of wide optical ribbons mated with one or more sides of said plurality of plates.

8. The detector as described in claim 1, further comprising signal processing means for signaling the presence of radiation in said plurality of plates.

* * * * *